United States Patent [19]
Nelson

[11] 3,913,454
[45] Oct. 21, 1975

[54] HYDRAULIC MOTOR
[75] Inventor: Roger John Nelson, Cedar Falls, Iowa
[73] Assignee: Deere & Company, Moline, Ill.
[22] Filed: Nov. 18, 1974
[21] Appl. No.: 524,506

[52] U.S. Cl. ............... 91/491; 180/66 F; 188/71.5; 417/273; 417/319
[51] Int. Cl.². F01B 1/06; B60K 3/00; F16D 55/36; F04B 49/00
[58] Field of Search ............ 91/473, 491; 180/66 F, 180/44 F; 188/71.5, 72.4, 366; 417/223, 319

[56] References Cited
UNITED STATES PATENTS

| | | | |
|---|---|---|---|
| 2,577,285 | 12/1951 | Stephan | 417/273 |
| 3,043,412 | 7/1962 | Bartholomaus et al. | 91/499 |
| 3,090,361 | 5/1963 | Orshansky | 180/66 F |
| 3,179,016 | 4/1965 | Thornton-Trump | 180/66 F |
| 3,266,715 | 8/1966 | Hass et al. | 417/223 |
| 3,439,766 | 4/1969 | Dence et al. | 91/499 |
| 3,770,075 | 11/1973 | Vegners | 180/66 F |
| 3,808,949 | 5/1974 | Muncke et al. | 91/473 |

FOREIGN PATENTS OR APPLICATIONS 48,439   2/1938   France .................. 417/223

Primary Examiner—William L. Freeh
Assistant Examiner—G. P. LaPointe

[57] ABSTRACT

A cam lobe type hydraulic motor intended to be used as a wheel motor has a rotor which is shiftable axially on the drive shaft and is normally held at one extreme end of its range of axial movement by a hydrostatic bearing. Means are provided to selectively shift the rotor towards the second end of its axial movement to frictionally engage side-by-side brake elements carried by the motor housing and the rotor.

17 Claims, 2 Drawing Figures

HYDRAULIC MOTOR

BACKGROUND OF THE INVENTION

The present invention relates generally to hydraulic motors and more particularly relates to improvements in hydraulic motors in the type used in propelling motor vehicles.

The use of hydraulic motors in both the primary drive system or a secondary drive system of motor vehicles is well known, an example being shown in U.S. Pat. No. 3,511,131 which issued to James Henry Kress on May 12, 1970. In the past, such hydraulic motors have been used to provide propulsion means only, and if braking of the vehicle is desired, the vehicle was provided with a separate brake system.

SUMMARY OF THE INVENTION

The primary object of the present invention is to provide a hydraulic motor having an integral brake system.

Another object of the present invention is to provide a hydraulic motor having an integral brake system which is actuated by axial movement of the motor rotor or cylinder barrel.

The above objects and additional objects and advantages of the present invention will become apparent to those skilled in the art from a reading of the following detailed description when taken in conjunction with the accompanying drawings.

DESCRIPTION OF PREFERRED EMBODIMENTS

Figure 1:
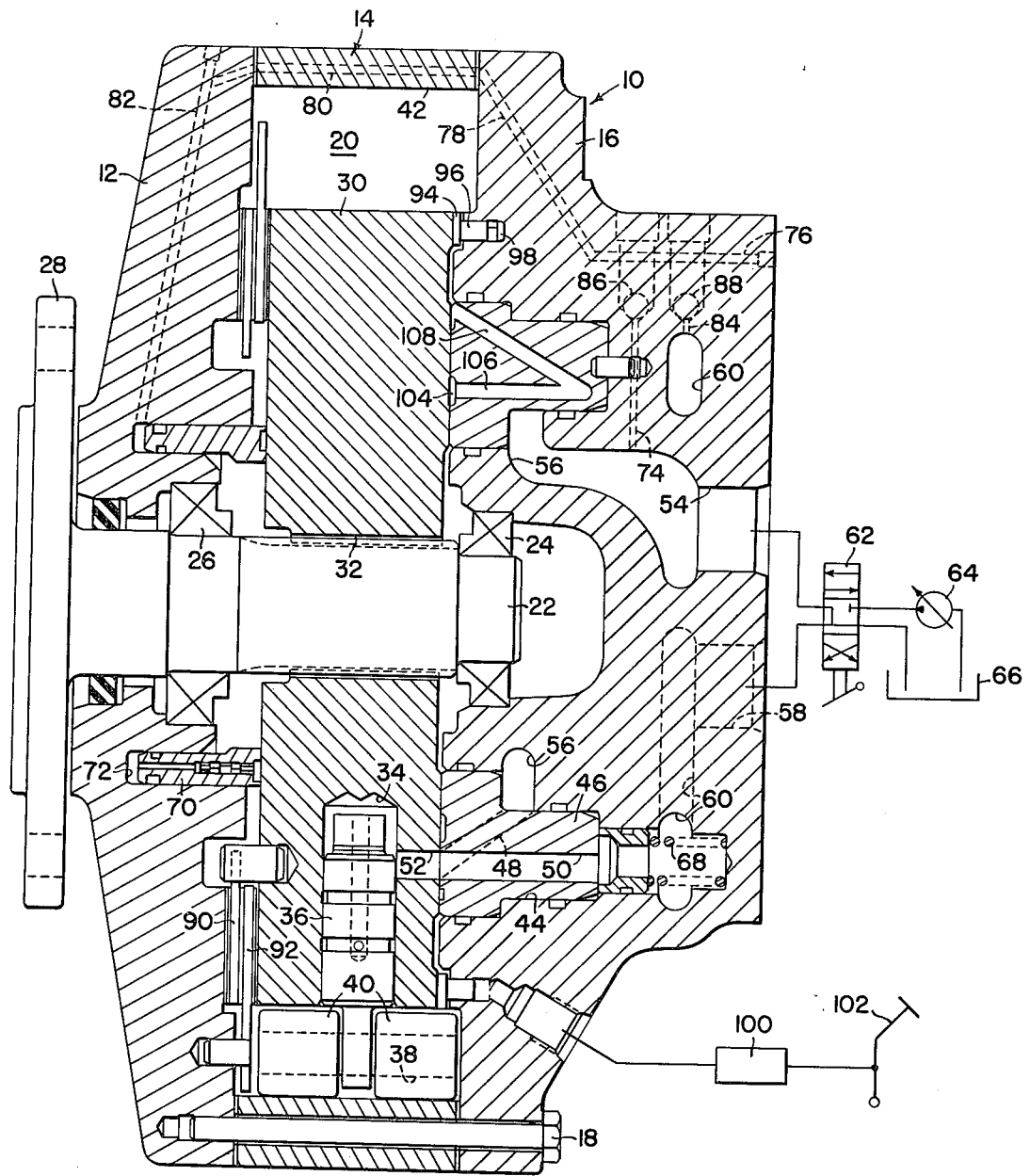
FIG. 1 is a sectional view of a hydraulic motor constructed in accordance with the present invention.

Referring to FIG. 1 of the drawing, a hydraulic motor constructed in accordance with the principles of the present invention is indicated generally by the reference numeral 10 and includes a housing having an end plate 12, a center section 14, and an end plate 16. The end plates and central section of the housing are secured together by bolts 18 to form a drive chamber 20. A drive shaft 22 is journaled in the housing by bearings 24 and 26, and has one end extending from the housing and terminating in a flanged end 28 which is adapted to be secured to a wheel hub or the like.

A cylinder barrel or rotor 30 is mounted on the shaft 22 and is splined as at 32 to the shaft for rotation therewith and for axial sliding movement with respect thereto. The rotor 30 is provided with a plurality (only one shown) of radially extending and outwardly open cylinders 34, and a plurality (only one shown) of pistons 36 are reciprocally mounted in the cylinders and project from the open ends thereof. The projecting end of each piston 36 carries a shaft 38 which journals a pair of rollers 40, one roller on each side of the piston. The rollers 40 engage a cam 42 formed on the inner surface of the center section of the housing. The cam has a continuous sinesoidal surface of the type generally described in U.S. Pat. No. 3,511,131 which issued to James Henry Kress on May 12, 1970 and the relationship of cam and pistons is generally as described in said patent, the disclosure of which is hereby expressly incorporated.

The end plate 16 of the motor housing is provided with an annular chamber 44, and an annular manifold 46 is slidably mounted therein. The manifold 46 is provided with a plurality of passages 48 and 50 which, upon relative rotation between the housing and rotor, alternately communicate with axial passages 52 extending from the inner ends of the cylinders 34 to a face or axial end of the rotor. The passages 48 are also in communication with a port 54 in the housing through passage 56, and the passages 50 are in communication with a port 58 in the housing through passage 60. As schematically illustrated in FIG. 1, the ports 54 and 58 are adapted to be connected through a valve 62 to a pump 64 and a reservoir 66. In one direction of rotation of the motor, for example the forward direction, the port 58 will be a pressure port and the port 54 will be an exhaust port while in the opposite direction of rotation of the motor the port 58 will be an exhaust port and the port 54 will be a pressure port.

The manifold 46 is slidably mounted in the chamber 44 and is urged against the end face of the rotor 30 by springs 68. The inner end of the manifold 46 and the inner portion of the chamber 44 where the passage 60 joins the chamber 44 forms an expansible pressure chamber which, when the port 58 serves as a pressure port, aids the springs 68 in maintaining the manifold 46 against the face of the rotor 30. Also, the manifold 46 and the chamber 44, in the area where the passage 56 joins the chamber 44, form an expansible pressure chamber which, when the port 54 serves as a pressure port, aids the springs 68 in maintaining the manifold 46 against the face of rotor 30. An annular piston 70 forming a hydrostatic bearing is slidably mounted in an annular chamber 72 provided in the housing end cap 12 and normally acts on the radial face or axial end of the rotor 30 opposite from the manifold 46 to prevent the force exerted on the rotor 30 by the manifold 46 from shifting the rotor to the left as viewed in FIG. 1. The inner end of the cylinder 72 is in communication with the passage 56 by way of passages 74, 76 and 78 in the end cap 16, passage 80 in the center section 14 and passage 82 in the end cap 12. The inner end of the cylinder 72 is also in communication with the passage 60 by way of a passage 84 which also communicates with the passage 76. Check valves 86 and 88 in the passages 74 and 84 prevent flow of fluid between the passages 56 and 60.

The hydraulic motor thus far described will operate in substantially the same manner as the typical cam lob motor. Specifically, when pressure is supplied to the port 58 it is routed through the passages 50 in the manifold 46 to the pistons starting on the down side of a cam lobe. The force between the piston and cam lobe will cause rotation of the rotor 30 and drive shaft 22 with respect to the housing. Fluid in the cylinders whose pistons are traveling up the cam lobe is exhausted through the passages 48 in the manifold 46 and finally out the port 54. The fluid pressure supplied to the port 58 is also routed to the inner end of the cylinder 72 and the pressure within the cylinder 72 action on the hydrostatic bearing 70 will hold the rotor 30 to the left against the manifold 46. The spring 68 and the fluid pressure acting on the inner end of the manifold 46 hold the manifold 46 against the rotor 30 to minimize leakage between the manifold and rotor, but do not provide sufficient force to shift the rotor to the left.

The motor illustrated in FIG. 1 also includes an integral brake, and to this end is provided with side-by-side brake disks 90 and 92 carried by the rotor 30 and housing end cap 12, respectively, so that when the rotor 30 is shifted to the left the brake rings 90 and 92 are clamped between the rotor and housing to frictionally retard relative movement between the rotor and housing. An annular pressure plate 94 is positioned between the rotor 30 and housing end cap 16 and an annular piston 96 is reciprocally mounted within an annular chamber 98 for movement into engagement with the pressure plate 94. The inner end of the annular cylinder 98 can be pressurized from a master cylinder 100 actuated through a brake pedal 102. As the annular chamber 98 is pressurized, the piston 96 is forced outwardly against the pressure plate which in turn engages the rotor 30 to force the rotor to the left against the brake disks. As the rotor 30 is moved to the left the manifold 46 is free to follow to maintain its engagement with the rotor.

The manually applied brake force is also supplemented by a hydraulic assist. With the pressure plate 94 held against the rotor 30 by the piston 96 the escape path for oil which leaks between the manifold and rotor face is eliminated so pressure builds up between the rotor and the end cap 16. This pressure buildup occurs between the manifold and brake pressure plate and piston and assists in forcing the rotor to the left against the brake disks. Pressure leakage inwardly between the manifold and rotor is vented to the area between the rotor and brake pressure plate by a groove 104 in the face of the manifold and passages 106 and 108 in the manifold.

Figure 2:
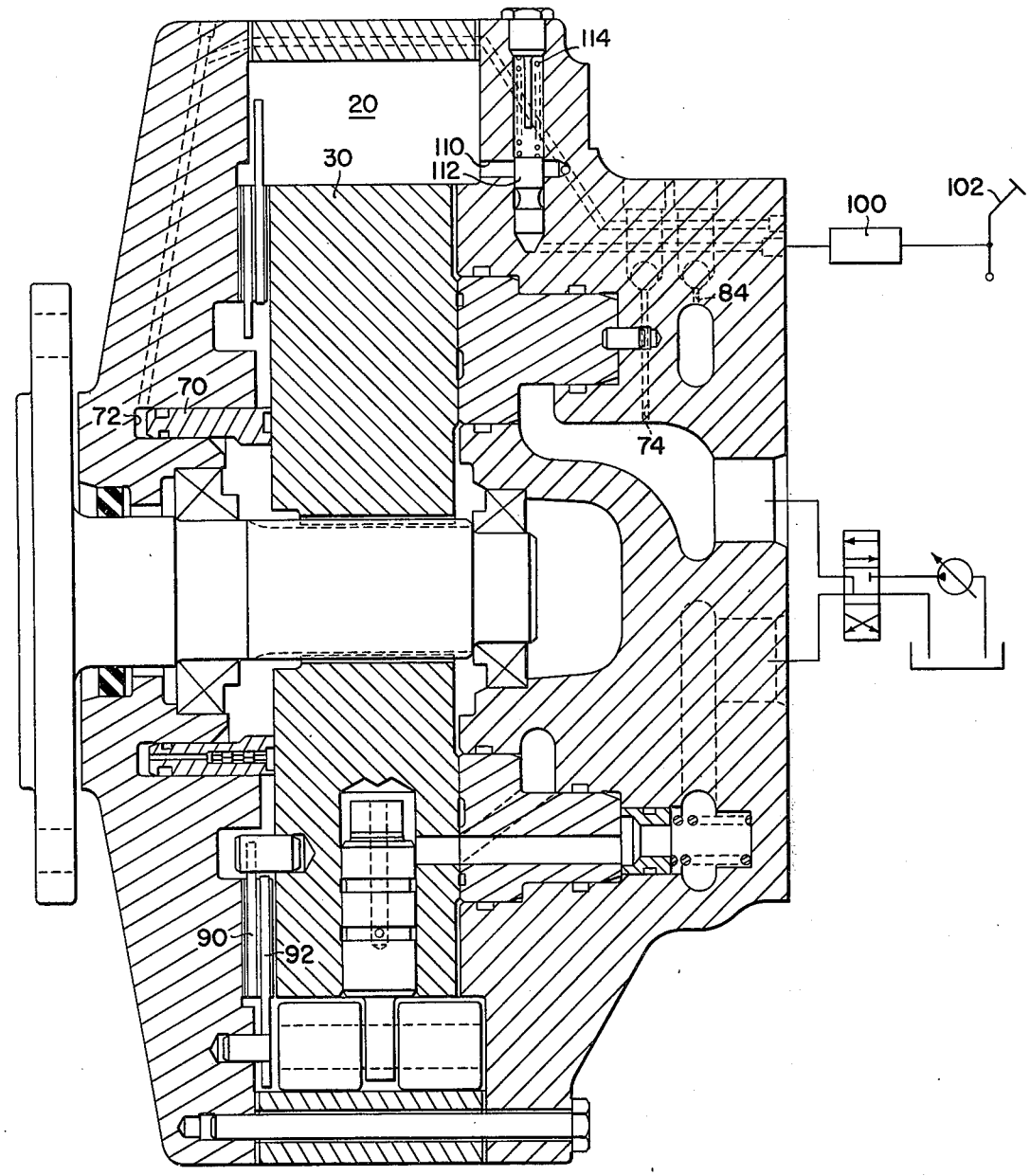
FIG. 2 is a view similar to FIG. 1 illustrating a modified form of a hydraulic motor constructed in accordance with the principles of the present invention.

A second embodiment of the invention is illustrated in FIG. 2 and is similar to the FIG. 1 embodiment in all respects except for the manner of applying the brakes. Therefore, only those parts of the motor necessary for an understanding of the second embodiment will be mentioned, and all other parts of the second embodiment will be identical to those in the first embodiment.

The second embodiment of the invention does not include a brake pressure plate and brake piston, but relies on control leakage of the pressure of the annular chamber 72 to relieve the force supplied on the rotor 30 by the hydrostatic bearing 70. To this end, a bleed passage 110 provides communication between the passage 78 and the chamber 20 of the motor. The passage 110 is normally closed by a valve member 112 which is biased to its closed position by spring 114. The valve element 112 is movable to an open position by fluid pressure from a master cylinder 100 which is manually controlled through a brake pedal 102. The fluid passageways 74 and 84 are made small enough to provide a restriction to fluid flow so that, when the valve 112 is open, pressure will be exhausted from the annular chamber 72. As the valve 112 is opened, and the pressure in the annular chamber 72 is reduced, the force on the back side of the manifold eventually becomes greater than that on the hydrostatic bearing so that the rotor 30 would be shifted to the left to frictionally engage the brake disks 90 and 92 between the rotor and brake housing.

Having thus described two embodiments of the invention, various modifications within the spirit and scope of the invention will become apparent to those skilled in the art. For example, in the first embodiment of the invention the piston 96 and pressure plate 94 could be made as an integral part without affecting the operation of the invention. Therefore, the invention should not be limited to the specific description and illustrations, but only by the following claims.

I claim:

1. A hydraulic motor comprising: a housing; a drive shaft journaled in the housing; a rotor slidably mounted on the shaft and keyed thereto for rotation therewith; cam means in the housing; a plurality of cylinders provided in the rotor having outer ends open toward the cam means; a plurality of pistons mounted in the cylinders and projecting therefrom into engagement with the cam means; fluid passage means providing communication between the inner ends of the cylinders and one axial end of the rotor; pressure and exhaust ports provided in the housing; manifold means reciprocally mounted in the housing for axial movement and in engagement with the one axial end of the rotor providing communication between the fluid passage means and the pressure and exhaust ports; means yieldably biasing the rotor toward the manifold; first and second side-by-side brake elements secured to the housing and the second axial end of the rotor, respectively; and means for selectively sliding the rotor axially in a direction to frictionally engage the brake elements.

2. A hydraulic motor as set forth in claim 1 wherein the biasing means is a hydrostatic bearing.

3. A hydraulic motor as set forth in claim 2 wherein the means for selectively sliding the rotor in a direction to frictionally engage the brake elements includes a pressure plate between the housing and the one axial end of the rotor and means for forcing the pressure plate against the one axial end of the rotor.

4. A hydraulic motor as set forth in claim 3 wherein the manifold is of annular configuration, the pressure plate is an annular member, and the means for forcing the pressure plate against the one axial end of the rotor includes an annular piston reciprocally mounted in and forming an expansible pressure chamber with the housing and projecting therefrom for engagement with the pressure plate, and means for pressurizing the chamber to force the piston against the pressure plate, whereby, when the chamber is pressurized and the piston and pressure plate forced against the rotor, the fluid which normally leaks between the manifold and rotor is trapped between the manifold and piston and pressure plate and acts on the rotor to aid in shifting the rotor to frictionally engage the brake elements.

5. A hydraulic motor as set forth in claim 2 wherein the manifold forms an expansible servo chamber with the housing which is responsive to fluid pressure from the pressure port to urge the manifold toward the rotor, and the means to slide the rotor in a direction to frictionally engage the brake element includes means to vent pressure from the hydrostatic bearing so that pressure within the servo chamber urges the manifold and rotor axially to frictionally engage the brake elements.

6. A hydraulic motor as set forth in claim 2 wherein the manifold is of annular configuration, and the means for selectively sliding the rotor axially in a direction to frictionally engage the brake elements includes an annular piston reciprocally mounted in and forming an expansible pressure chamber with the housing and projecting therefrom toward the one axial end of the rotor, and means for pressurizing the chamber to force the piston outwardly, whereby, when the chamber is pressurized the piston slides the rotor axially and fluid which normally leaks between the manifold and rotor is trapped between the manifold and piston and acts on the rotor to aid in shifting the rotor to frictionally engage the brake elements.

7. A hydraulic motor comprising: a housing; a drive shaft journaled in the housing; a rotor mounted on the drive shaft for rotation therewith and axial sliding movement thereon; cam means in the housing encircling the rotor; a plurality of radially extending and outwardly open cylinders provided in the rotor; a plurality of pistons reciprocally mounted in the cylinders and projecting therefrom into engagement with the cam means; fluid passage means providing communication between each of the cylinders and one axial end of the rotor; fluid pressure and exhaust ports provided in the housing; an annular chamber provided in the housing adjacent to and facing the one axial end of the rotor; an annular manifold means reciprocally mounted in the chamber and providing communication between the fluid passage means and the inlet and outlet ports; the manifold means and the chamber defining an expansible pressure chamber in communication with the pressure port responsive to fluid pressure to bias the manifold means into engagement with the one axial end of the rotor; means yieldably biasing the rotor toward the chamber in opposition to the bias provided by fluid pressure in the pressure chamber; first and second side-by-side brake elements secured to the second axial end of the rotor and the housing adjacent the second axial end of the rotor, respectively; and means for selectively acting in cooperation with the pressure chamber to move the rotor axially in opposition to the yieldable biasing means and frictionally engage the brake elements.

8. A hydraulic motor as set forth in claim 7 wherein the means selectively acting in cooperation with the pressure chamber includes means for relieving the force provided the yieldable biasing means.

9. A hydraulic motor as set forth in claim 7 wherein the yieldable biasing means includes a hydrostatic bearing responsive to fluid pressure from the pressure port and action on the second axial end of the rotor, and the means for selectively acting in cooperation with the pressure chamber includes means to vent the fluid pressure from the hydrostatic bearing.

10. A hydraulic motor as set forth in claim 9 wherein restricted fluid passage means provides communication between the pressure port and hydrostatic bearing; and the means to vent fluid pressure from the hydrostatic bearing includes a bleed passage in communication with the restricted passage means, a normally closed valve means interposed in the bleed passage, and manually actuable means for opening the valve means.

11. A hydraulic motor as set forth in claim 7 wherein the means selectively acting in cooperation with the pressure chamber includes a pressure plate between the housing and the one axial end of the rotor, and means to force the pressure plate against the rotor to urge the rotor axially.

12. A hydraulic motor as set forth in claim 11 where the means to force the pressure plate against the rotor includes chamber means in the housing open toward the pressure plate, piston means reciprocally mounted in the chamber means and projecting therefrom for engagement with the pressure plate; and means for providing pressurized fluid to the inner end of the chamber means to force the piston means outwardly.

13. A hydraulic motor as set forth in claim 12 wherein the pressure plate is an annular member, the chamber means is annular, and the piston means is an annular piston whereby, when the annular piston means is forced outwardly into engagement with the pressure plate, normal fluid leakage between the rotor and manifold is trapped between the manifold and the pressure plate and annular piston means and acts on the rotor to aid the annular piston means in moving the rotor axially to frictionally engage the brake elements.

14. A hydraulic motor as set forth in claim 13 wherein the manifold means and chamber define first and second pressure chambers each in communication with a different one of the pressure and exhaust ports, the restricted fluid passage means provides communication between both the pressure and exhaust ports and the hydrostatic bearing, and check valve means in the restricted fluid passage means prevent fluid flow from one port to the other.

15. A hydrostatic motor comprising: a housing; a drive shaft journaled in the housing; a rotor mounted on the drive shaft for rotation therewith and axial sliding movement thereon; cam means in the housing encircling the rotor; a plurality of radially extending and outwardly open cylinders provided in the rotor; a plurality of pistons reciprocally mounted in the cylinders and projecting therefrom into engagement with the cam means; fluid passage means providing communication between each of the cylinders and one axial end of the rotor; fluid pressure and exhaust ports provided in the housing; an annular chamber means provided in the housing adjacent to and facing the one annular end of the rotor; an annular manifold means reciprocally mounted in the chamber means and providing communication between the fluid passage means and the inlet and outlet ports; the manifold means and the chamber means defining an expansible pressure chamber in communication with the pressure port whereby fluid under pressure supplied through the pressure port biases the manifold means into engagement with the one axial end of the rotor; means yieldably biasing the rotor toward the chamber means in opposition to the bias provided by fluid pressure in the pressure chamber to normally hold the manifold at the inner end of its reciprocal movement; first and second side-by-side brake elements secured to the second axial end of the rotor and the housing adjacent the second axial end of the rotor, respectively; and means for selectively acting on the rotor to move the rotor axially in opposition to the yieldable biasing means and frictionally engage the brake elements.

16. A hydraulic motor as set forth in claim 14 wherein the means for selectively acting on the rotor includes a chamber in the housing open toward the one axial end of the rotor, piston means reciprocally mounted in the chamber and projecting therefrom, and means for providing pressurized fluid to the inner end of the chamber to force the piston means outwardly.

17. A hydraulic motor as set forth in claim 16 wherein the pressure plate is an annular member, the chamber means forming the cylinder means is annular, and the piston means is an annular piston whereby, when the annular piston is forced outwardly into engagement with pressure plate, normal fluid leakage between the rotor and manifold is trapped between the manifold and the pressure plate and annular piston and acts on the rotor to aid the annular piston in moving the rotor axially to frictionally engage the brake elements.

* * * * *